Nov. 26, 1968 R. A. THORPE 3,413,453

HYBRID RAMP FUNCTION GENERATOR TO DEFLECT ELECTRON BEAM

Filed Jan. 15, 1965 2 Sheets-Sheet 1

INVENTOR
ROBERT A. THORPE
BY Joseph J. Connerton
ATTORNEY

United States Patent Office 3,413,453
Patented Nov. 26, 1968

3,413,453
HYBRID RAMP FUNCTION GENERATOR TO DEFLECT ELECTRON BEAM

Robert A. Thorpe, Poughkeepsie, N.Y., assignor to International Business Machines Corporation, Armonk, N.Y., a corporation of New York Continuation-in-part of application Ser. No. 397,187, Sept. 11, 1964. This application Jan. 15, 1965, Ser. No. 425,799
11 Claims. (Cl. 235—150.53)

ABSTRACT OF THE DISCLOSURE

In a constant time display for deflecting a cathode ray tube beam between two specified coordinate addresses, an overdrive signal corresponding to a predetermined multiple of the relative deflection signal is combined with the initial coordinate address in digital form, decoded to analog form and the corresponding analog signal applied to an integrating circuit. By attempting to charge toward the simulated overdrive level, the linearity of the ramp generated by the integrator is increased during the specified interval to provide a precise linear beam displacement. When terminated after the specified interval, the resultant location of the CRT beam corresponds to the location identified by the endpoint coordinate address.

This application is a continuation-in-part of Ser. No. 397,187, filed by Robert A. Thorpe on Sept. 17, 1964, now abandoned.

The present invention relates to an electronic circuit and more particularly to a system for generating electronical waveforms useful in deflecting an electron beam.

In cathode ray tube vector or character generating systems or character recognition systems, it is frequency necessary to deflect an electron beam in accordance with a predetermined scanning pattern. One example for such a requirement is found in cathode ray tube vector or character generation systems which operate in combination with a control device such as a data processing system to generate vectors or characters on the screen of a cathode ray tube. In a CRT display system of the type above described, it is desirable to specify the endpoint addresses of the vector to be generated in digital form and generate the appropriate deflection signal directly from the specified addresses.

In the known prior art, analog techniques have been devised for generating substantially linear ramp waveforms of variable slope in a fixed time T for the purpose of driving CRT deflection systems. However, such systems suffer from the inherent limitations of any analog system, i.e., inaccuracy and inability to precisely control the timing functions which cannot be tolerated in a high precision display system. One known system of the prior art for accomplishing the same function as that of the instant invention utilized a programmable current source to apply predetermined current steps to a delay network terminated in its characteristic impedance at the input side and in a short circuit on the output side. An integrating network was connected in parallel with the delay network such that each input step function caused a series of step voltages of predetermined amplitude and duration to be generated. Each step voltage, when integrated, generated a signal which, when terminated by a change in step voltage, caused the signal level to switch to the newly specified value linearly with time. However, various problems associated with delay lines such as fixed time constants, ringing and noise in the networks as well as the difficulty in terminating and matching the delay characteristics of different delay lines constituted severe restrictions which limited the utility of such systems and precluded their use in a high precision display system. A further problem associated with delay line systems was the non-linear frequency and amplitude response of such systems.

In accordance with the present invention, there is provided a hybrid function generator comprising both digital and analog components for generating a ramp function which varies linearly with time. The display contemplated by the present invention allows for addressing an $x$-$y$ grid coordinate system of 4096 x 4096 raster units. Digital input signals indicative of the endpoint addresses of the vector to be drawn or reproduced on a cathode ray tube display system are logically manipulated to derive difference signals identifying the endpoint addresses of the vectors in relative form, i.e., the address of one endpoint relative to the address of the preceding endpoint. After resolving the relative addresses precisely in digital form as above described, an overdrive signal equal to a predetermined multiple of the difference signal or relative address is generated and the resultant signal converted to a corresponding analog potential and applied to an integrating circuit for a predetermined controlled interval corresponding to the time constant of the integrator. At the end of this predetermined interval, timing means are provided for reducing the voltage impressed on the integrator from an overdrive level to the proper level deflection. By generating an overdrive signal indicative of a predetermined multiple of the relative vector addresses and applying this voltage to an integrating circuit for a predetermined time, the linear portion of the characteristic curve of the integrator circuit is employed to provide a precise linear displacement within a controlled time period. The system is further adapted to generate positive or negative waveforms in accordance with the direction of the vector to be drawn. The overdrive signal effectively simulates an address beyond the normal display range thereby providing a more linear integrator charging circuit. By performing derivations in digital form and limiting the analog portion of the system to generation of the ramp function, a vector generating system of high linearity is provided.

Accordingly, a primary object of the present invention is to provide an improved function generator.

Another object of the present invention is to provide an improved linear ramp generator circuit for generating linear ramp waveforms of variable slopes for the purpose of driving CRT deflection systems.

A further object of the present invention is to provide an improved function generator adapted to generate positive or negative ramp signals in a controlled time period.

Still another object of the present invention is to provide a hybrid generator including a digital logical configuration for generating an overdrive signal comprising a predetermined multiple of the deflection signal.

Another object of the present invention is to provide a digital-analog ramp generating system wherein an overdrive signal comprising a predetermined multiple of an input signal is derived digitally and the corresponding decoded analog signal integrated to provide a linear ramp function.

Another object of the present invention is to provide an improved ramp generator for generating a linear ramp function directly from digital information defining the endpoints of a vector to be displayed.

The foregoing and other objects, features and advantages of the invention will be apparent from the following more particular description of the preferred embodiment of the invention, as illustrated in the accompanying drawings.

Figure 1:
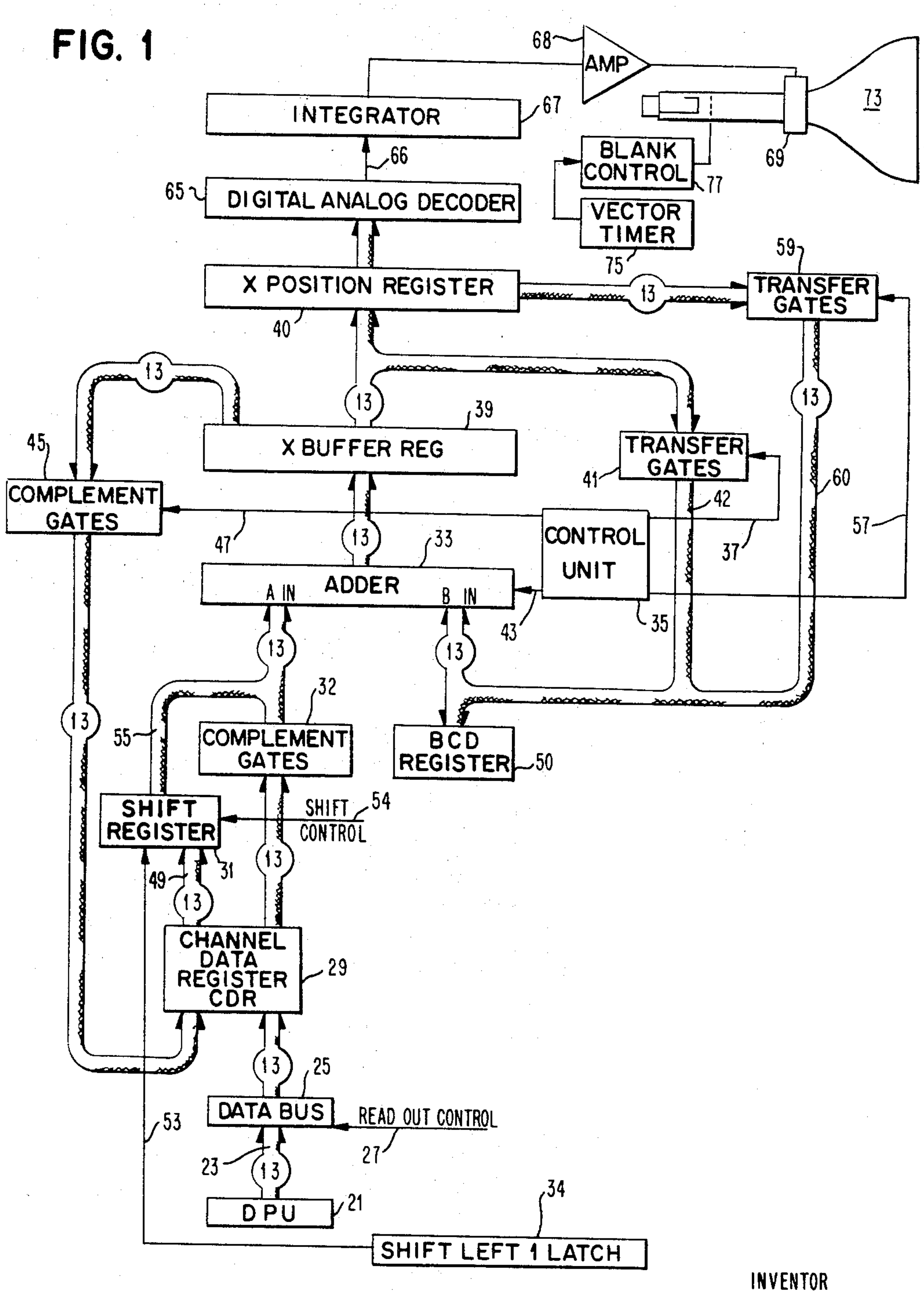
FIGURE 1 illustrates in block form a preferred embodiment of the subject invention in absolute vector mode.
Figure 2:
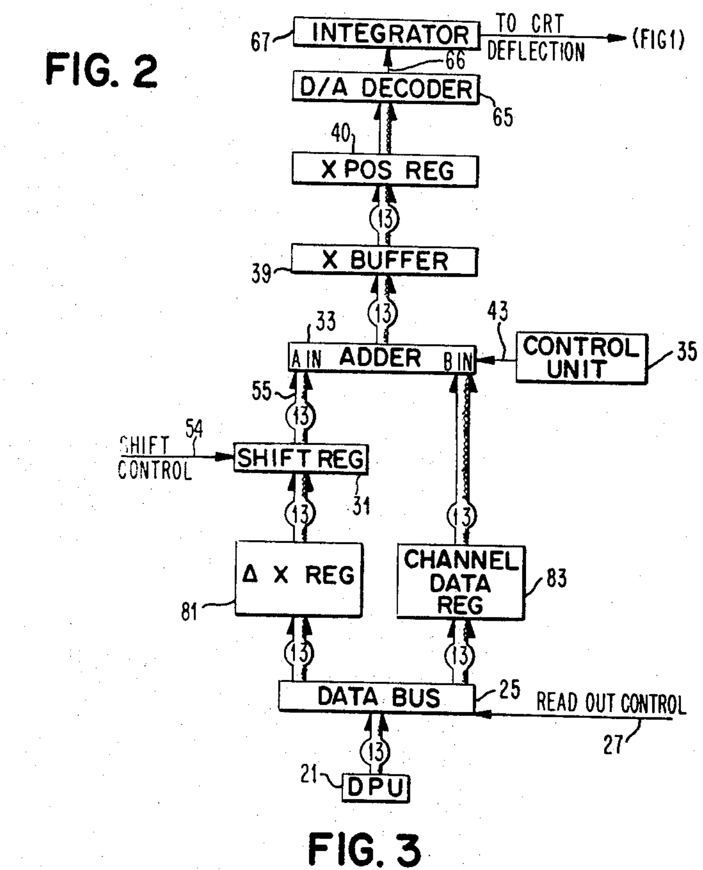
FIGURE 2 illustrates in block form a preferred embodiment of the subject invention in relative vector mode.

FIGURES 3A, 3B, and 3C illustrate waveforms appearing at various points in the circuit of FIGURES 1 and 2.

Throughout the following descriptions and in the accompanying drawings there are certain conventions employed which are familiar to certain of those skilled in the art. Additional information concerning these conventions is as follows:

In the logical or block diagrams of the drawings a conventional arrowhead is employed to indicate (1) a circuit connection, (2) energization with pulse signals and (3) the direction of pulse travel which is also the direction of control. Cables are indicated by two lines terminated in arrowheads, the number of conductors being indicated by arcuate extensions in the cable. When storage registers are employed, such register stages are assumed to include input and output gating circuitry which form part of and are controlled by the associated data processing unit. In the description, a general arrangement of the preferred embodiment of the invention will be described with respect to the manner in which the various circuit components and apparatus are interconnected as well as the general overall operation which is performed by these components and apparatus.

The particular display employed with the preferred embodiment of the invention includes a cathode ray tube display area which may be considered as divided into a grid format of 4096 by 4096 addressable raster units, each raster unit comprising the distance between intersect points, in which images are generated by deflection of the CRT electron beam to the selected addressable intercept points. In the ensuing description, the manner in which the vectors, the endpoints of which are identified in digital form are generated will be described. To clarify the description of the present invention, only the generation of the horizontal or X component will be described, although it will be appreciated that the vertical or Y component will be generated in identical manner and both component signals applied to their corresponding deflection points to generate a specified vector.

Referring now to the drawings and more particularly to FIGURE 1 thereof, assuming that digital components of the system are initially cleared or reset, a digital message of 13 binary bits is applied from data processing unit (DPU) 21 via cable 23 to a data bus 25. Since the system specifications previously defined have indicated an addressable grid raster of 4096 by 4096 raster units, a 12 bit word would appear to be required. However, as more fully described hereinafter, an address beyond this range is simulated for a predetermined time to generate the overdrive signal, necessitating an additional position or bit on the address for a total of 13 bits. In response to a read out control signal on line 27, the X position data in data bus 25 is transferred to channel data register 29, hereinafter designated CDR, from where it is applied either through complement gates 32 or through shift register 31 to the A input of Adder 33. For purposes of the instant invention, shift register 31 is a conventional shift register adapted to provide a zero shift or a single position left shift under control of associated shift latch 34. In the zero shift position, shift register 31 merely functions as a transfer gate from the CDR 29 to Adder 33. Adder 33 may be any conventional full adder known in the art which can generate the sum of 3 input variables A, B and a carry C.

To generate the initial X position, assuming a positive absolute vector, the X coordinate data is transferred in complement form from CDR 29 via complement gates 32 to the A input of adder 33. In response to a control signal generated by control unit 35 on line 57, the contents of the X position register 40, comprising the horizontal component of the vector position (initially zero), are transferred through transfer gates 59 and cable 60 to the B input of adder 33. Control unit 35, for purposes of the instant invention, may be merely a timing pulse generator which generates timing or control pulses in the described sequence. Registers 39 and 40 may be any conventional bi-stable registers comprised of latches, triggers, etc., which are well known and available in the art. A control signal applied from control unit 35 to adder 33 on line 43 causes a full add cycle to be initiated, the resultant sum signal generated by adder 33 corresponding to the complement difference between the X coordinates of the vector, or delta X. The coordinate distance which the beam is to move from one position to another is defined as delta X and delta Y. This complement difference is then transferred to the X Buffer Register 39, while the complement of this value, representing the true difference, is transferred from the X Buffer Register through complement gates 45 under control of line 47 to CDR 29, which thus contains the true delta X quantity. The operation for a negative absolute vector is identical except that the computed difference appears complemented in CDR 29.

The next step in the vector generation sequence is to generate a multiple of delta X, designated an overdrive signal, a multiple of 3 being used in the preferred embodiment for reasons more fully described hereinafter. The overdrive signal is generated in the following manner. The X value stored in X position register 40 (initially zero) is transferred through transfer gates 59 and cable 60 to the B input adder 33. The delta X quantity stored in CDR 29 is applied through the zero path of shift register 31 and via cable 55 to the A input of the adder. On the next at cycle initiated by a control signal on line 43, a signal corresponding to the quantity X plus delta X is generated and stored in X buffer register 39. The quantity X plus delta X in the X buffer register 39 is then transferred through transfer gates 41 in response to a control signal on line 42 to a buffer register designated BCD Register 50 for temporary storage. The delta X quantity in CDR 29 is then transferred to shift register 31, and in response to a "shift left 1" latch signal on line 53 and a shift control signal on line 54, the delta X quantity is converted into 2 delta X and then applied through cable 55 to the A input of adder 33. The X plus delta X quantity in BCD register 50 is then transferred to the B input of adder 33. In response to a control signal applied to line 43, a full add cycle is generated whereby a signal corresponding to the quantity X plus 3 delta X is generated and stored in X Buffer Register 39. The quantity X plus 3 delta X is then transferred to the X position register 40, at which time the vector timer 75 is started. Effectively, the X plus 3 delta X signal defines an overdrive signal of 3 delta X from the initial (or previous) X position. This quantity is then decoded to a corresponding analog signal in digital to analog decoder 65 and applied through line 66 to integrator circuit 67. The output of integrator 67 is applied to amplifier 68 which provides a current output which drives the X component of deflection yoke 69 on CRT 73. Digital to analog decoder 65 may comprise any well known and commercially available *D/A* converter, while integrator 67 in its simplest embodiment would merely comprise a serially connected RC circuit. As previously indicated, when the overdrive signal is applied to integrator 67, vector timer 75 is started, since the display system herein employed utilizes a precisely controlled constant time system, i.e., each vector is generated in time T irrespective of the vector length. Integrator 67 begins charging from the previous X level toward the X plus 3 delta X level, but by designing the appropriate RC time constant of integrator 67, the ramp signal will always travel in time T one-third of the distance required to reach the X plus 3 delta X level, i.e., to level X plus delta X. When the overdrive signal is applied to the integrator, the circuit attempts to charge to the specified overdrive level such that the initial portion of the RC curve provides a linear displacement within a specified time period T compared to the RC curve which would be generated if the integrator were charging only toward X plus delta X. Thus by controlling the amount of the overdrive, the RC time constant of the integrator and the time period T, the linearity of the ramp can be precisely controlled.

During the time that the ramp function is being generated and the vector being drawn on the CRT screen, the value of X plus delta X, which represents the real endpoint of the present vector, is transferred from the BCD register 50 through adder 33 to the X buffer register 39. At the end of the specified time interval T determined by vector timer 75, the quantity X plus delta X is transferred from the X buffer register 39 to the X position register 40. Because of the time constant of the integrator circuit, the ramp signal will always have travelled one-third the distance specified by the overdrive signal and will thus be at the level X plus delta X at precisely the time at which the overdrive signal falls to this level as a result of the last transfer operation. A minimum time between vectors is required for the CRT yoke to settle out. In the display system herein described, a period of 102 microseconds is required for vectors generated up to ¼ screen size, while larger vectors require multiples of 102 microseconds. At the time the vector is assumed completed, the vector timer 75 shuts off the blank control circuit 77 which controls the CRT beam intensity.

The endpoint of the vector just drawn, X plus delta X, now becomes the initial point of the next vector and the entire operation above described is repeated with the introduction of a newly specified vector endpoint into CDR 29 from DPU 21 via Data Bus 25. In this manner a precise control of each overshoot is attained, precise control over the time period allotted for the specified vector is maintained and the system generates a waveform which when integrated is precise and predictable over the range of interest.

Referring now to FIGURE 2, there is illustrated in simplified block schematic form an embodiment of the subject invention wherein input signals are specified in relative form, i.e., the difference between the vector endpoints (delta X) are specified by the Data Processing Unit rather than being computed as in the FIGURE 1 arrangement. To simplify the ensuing description, corresponding elements to those shown in FIGURE 1 are identified by the same subscripts. The values of X and delta X are applied from the Data Processing Unit 21 to the Data Bus 25, from there they are distributed to the Delta X Register 81 and Channel Data Register 83, the latter corresponding essentially to CDR 29 in FIGURE 1. Assuming that the system is initially cleared or reset, the X value representing the vector endpoint and the delta X values are applied to the respective registers 83 and 81. The X value referred to here is equal to the X plus delta X value referred to in the description of operation relating to FIGURE 1, since it applied to the value of the endpoint to which the CRT beam will be moved. The delta X value is equal to the difference between the present X value and the previous X value. The delta X value in register 81 is applied to shift register 31, which is maintained in a shift left 1 mode, the resultant 2 delta X quantity being applied through cable 55 to the A input of Adder 33. The X value (X+delta X) in channel Data register 83 is transferred through register 31 to the B input of Adder 33. In response to a control signal on line 43, a full add operation occurs in which the X plus delta X and the 2 delta X values are added to provide an output to the X buffer register 39 equal to X plus 3 delta X. This value is then applied through the X position register 40 to the digital to analog decoder 65, the resultant output of which integrated by integrator 67 and applied to the CRT deflection circuitry. The deflection circuitry corresponding to that shown in FIGURE 1 has been omitted from the drawing of FIGURE 2 in the interest of clarity. Likewise the vector timing and blank control circuitry of the FIGURE 2 embodiment is identical to that shown and described in FIGURE 1. The embodiment in FIGURE 2 represents a simpler logical configuration, since both the X and delta X values are specified by the Data Processing Unit 21 rather than being resolved from the absolute endpoint addresses as per FIGURE 1. However, the same advantages of linearity resulting from precise control of the overshoot signal and precise computer controlled timing are provided in the FIGURE 2 configuration.

Figure 3:
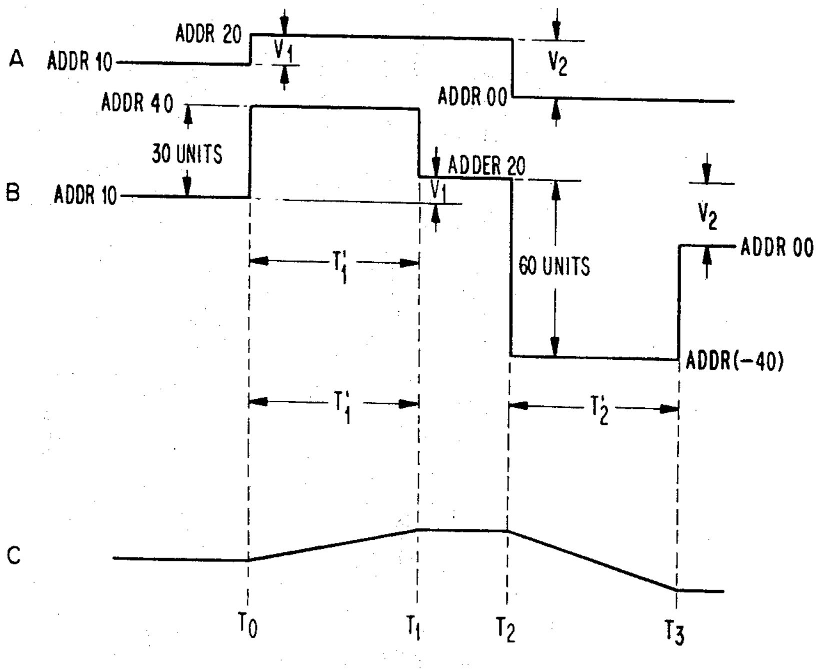

Referring now to FIGURE 3, there is illustrated a family of waveforms to clarify the operation of the logical configurations of FIGURES 1 and 2. The waveforms utilized for purposes of illustration will be shown in relative rather than absolute values, i.e., will be described in terms of units rather than specific current-voltage levels. FIGURE 3A illustrates the input signals required for a typical vector generation situation. Initially, at time $T_0$, an input signal corresponding to plus ten units is applied from address 10 to address 20 and remains at this level until time $T_2$, at which time a negative transistion from address 20 to address 00 occurs for a total transistion of minus 20 units.

Referring to FIGURE 3B, the corresponding overdrive signal for the input situation illustrated in FIGURE 3A is shown. At time $T_0$, an overdrive signal equal to 3 delta X (30 units) is generated, added to the initial signal X (10 units) and applied to the *D/A* Decoder 65 as previously described. This overdrive signal thus changes from address 10 to address 40. At time $T_1$, the overdrive pulse is terminated, and the signal level returns to the specified address 20. The corresponding ramp signal between time $T_0$ and time $T_1$ is shown in FIGURE 3C. The time between $T_1$ and $T_2$, which will vary in accordance with the specific CRT display situation, is that time required for the time constant of the CRT yoke to settle out. At time $T_2$, the X plus 3 delta X value is equal to 40 units, since the initial address of X is plus 20 units and delta X is equal to minus 60 units. At time $T_3$, the overdrive signal returns to its original value of X+delta X or address 00. The corresponding ramp signal is indicated in FIGURE 3C. It should be noted that although the magnitudes of the specified signals may vary, the time $T_1'$ and $T_2'$ for generating the ramp functions are identical.

Referring to FIGURE 3C, the capacitor in the integrator circuit begins to charge at a relatively linear rate during the interval between $T_0$ and $T_1$, remains constant after time $T_1$ until time $T_2$, at which time it begins to charge in the opposite direction. The ramp waveform may be specified by the formula $e=E/R(1-E^{-t/RC})$ such that $e$ will vary directly as a function of the overdrive voltage E at any specified time $t$. By generating an overdrive signal and thereby utilizing the linear portion of the resulting RC integrator curve in the manner described, the resulting vector will be substantially linear. As shown in FIGURE 3, current sweep waveforms of positive or negative slope are generated by the same circuit, a system requirement since the environmental display of the present invention must be adapted to generate vectors interconnecting any two endpoints on the CRT screen within the prescribed limits and in the direction specified by the associated central processing unit.

While the display system has been defined as utilizing magnetic deflection and therefore utilizing a current ramp signal, the invention is equally applicable to electrostatic deflection by utilizing a voltage output from an amplifier. While the preferred embodiment has been described with respect to an overdrive or K factor of 3, additional flexibility is afforded due to the relationship between the overdrive signal, the length of the digital word used to identify the endpoint addresses and the length and linearity of the vector to be drawn on the screen of the CRT. Generally speaking, the higher the overdrive or K factor, the greater the linearity of the resultant display.

However, to increase the value of the K factor, either a larger word length or a smaller vector size would be required. Conversely, the larger the word length, the greater the cost of the system; the shorter the maximum vector size, the greater amount of time required to generate vectors. Utilizing the same word size, for example, an overdrive factor of 5 would necessitate decreasing the maximum length of vector to be drawn from ¼ to ⅛ screen size. Alternately, a K factor of 5 could be used for a ¼ screen size vector by increasing the word size from 13 to 14 bits. Thus the present invention affords substantial flexibility in that the ultimate design of a display can be varied in terms of economy or speed determined by the particular linearity requirements of the system. The present invention affords a hybrid solution to the linear generator in that a logical arithmetic configuration is employed to precisely compute an overdrive signal and control the duration thereof while the analog portion including an integrator circuit is employed to generate the actual ramp signal.

While the invention may be implemented in any compatible logic system, a preferred logical implementation is diffused diode transistor logic described and set forth in copending application Ser. No. 357,372, Data Processing System, filed by Gene Amdahl et al., Apr. 6, 1964 and assigned to the assignee of the present invention. Registers employed may be latch registers which are set forth and described in U.S. Patent No. 3,115,574, High Speed Multiplier, issued to G. T. Paul et al., Dec. 24, 1963.

While the invention has been particularly shown and described with reference to preferred embodiment thereof, it will be understood by those skilled in the art that various changes in form and details may be made therein without departing from the spirit and scope of the invention.

What is claimed is:

1. A system for generating a signal for controlling the deflection of a cathode ray tube comprising in combination a digital data source, said digital data source defining the absolute coordinate addresses of a vector having initial and terminal endpoints to be generated on the screen of said cathode ray tube, means for generating signals indicative of the relative coordinate addresses of each of said vectors, means for deriving an overdrive signal corresponding to a predetermined multiple of said relative address, means for generating a signal equal to the sum of the absolute address of the initial endpoint of a given vector and said overdrive signal for the same vector, and means for applying an analog representation of said sum signal to an integrating circuit to provide a ramp voltage signal corresponding in duration to that of said overdrive signal.

2. A function generator comprising in combination a data source, said data source defining the absolute coordinate initial and terminal endpoint addresses of a vector to be generated on the screen of a cathode ray tube, means for determining the relative coordinate addresses of each of said vectors and generating overdrive signals indicative of a predetermined multiple thereof, means for generating a signal equal to the sum of the absolute address of said initial endpoint and said overdrive signal, means for controlling the duration of said sum signal, and means for integrating an analog representation of said sum voltage to provide a linear ramp function.

3. A function generator for generating a linear ramp function comprising in combination a digital data source, said digital data source defining the absolute coordinate initial and terminal endpoint addresses of a vector on the screen of a cathode ray tube, means for determining the relative coordinate addresses of each of said vectors and generating overdrive signals indicative of a predetermined multiple thereof, means for generating a signal equal to the sum of the absolute address of said initial endpoint and said overdrive signal, means for controlling the duration of said sum signal, means for converting said sum signal to an analog representation thereof, and means for integrating said analog representation of said sum voltage to provide a linear ramp function.

4. A device of the character defined in claim 3 wherein said means for converting said sum signal to an analog representation thereof comprises a digital to analog decoder.

5. A signal generator comprising in combination an integrating circuit, digital circuit means for generating a first signal level to be applied to said integrating circuit, said first signal being identified by an absolute address and a predetermined multiple of a relative address, means for terminating said integrating circuit output a predetermined time interval after said signal level is applied thereto, and means for generating a linear signal during said time predetermined interval which corresponds in amplitude to the sum of said absolute and said relative addresses.

6. A signal generator comprising in combination an integrating circuit.

digital circuit means for generating a signal level to be applied to said integrating circuit, said signal level comprising the sum of the absolute address and a multiple of the relative address of a vector to be drawn on the screen of a cathode ray tube, means for terminating said integrating circuit output a predetermined time interval after said signal level is applied thereto, and means including said integrator circuit for generating a linear signal during said time predetermined interval which corresponds in amplitude to said absolute addresses at the end of said predetermined interval.

7. A signal generator comprising in combination an integrating circuit, digital circuit means for generating a signal level to be applied to said integrating circuit, said signal level comprising the sum of the absolute address and a multiple of the relative address of a vector to be drawn on the screen of a cathode ray tube, means for terminating said integrating circuit output a predetermined time interval after said first circuit is applied thereto, the resulting level of said signal, when terminated, corresponding to the sum of said absolute address and said relative address of said vector, and means including said integrating circuit for generating a linear ramp signal during said time predetermined interval.

8. A system for generating a plurality of signals for controlling the deflection of a cathode ray tube, said system including a plurality of function generators, each of said function generators comprising in combination, a digital data source, said digital data source defining the absolute coordinate endpoint addresses of vectors to be generated on the screen of a cathode ray tube, means for determining the relative coordinate addresses of each of said vectors and generating signals indicative thereof, means for generating overdrive signals corresponding to predetermined multiples of said relative address signals, means for generating a signal equal to the sum of the absolute address of the initial endpoint of a given vector and the overdrive signal for the same vector, means for converting said sum signal to a corresponding analog voltage, an integrating circuit, and means for applying said analog voltage to said integrating circuit to provide a ramp signal corresponding in duration to the duration of said overdrive signal.

9. A device of the character claimed in claim 8 further including timing control means for precisely controlling the duration of said sum signal and unblanking said beam during said interval to thereby generate said vector on said cathode ray display.

10. A system for generating a plurality of signals for controlling the deflection of a cathode ray tube, said system including a plurality of function generators, each of said function generators comprising in combination, a digital data source, said digital data source defining the absolute coordinate endpoint addresses of vectors to be generated on the screen of said cathode ray tube, means for determining the relative coordinate addresses of each of said vectors and generating signals indicative thereof, means for generating digital overdrive signals corresponding to a predetermined multiple of said relative address, means for generating a signal equal to the sum of the absolute address of the initial endpoint of a given vector and said overdrive signal for the same vector, means for controlling the duration of said sum signal, means for converting said sum signal to a corresponding analog voltage, an integrating circuit, means for applying said analog voltage to said integrating circuit to provide a ramp voltage signal corresponding in duration to the duration of said overdrive signal, and means for converting said ramp voltages to corresponding current waveforms for application to the electromagnetic deflection elements of said cathode ray tube.

11. A device of the character claimed in claim 10 wherein said duration controlling means comprises a digital clock.

References Cited

UNITED STATES PATENTS

| | | | |
|---|---|---|---|
| 3,047,851 | 7/1962 | Palmiter | 340—324.1 |
| 3,205,344 | 9/1965 | Taylor et al. | 340—324.1 X |
| 3,325,802 | 6/1967 | Bacon | 340—324.1 |
| 3,329,948 | 7/1967 | Halsted | 340—324.1 |

MARTIN P. HARTMAN, *Primary Examiner.*